US012033536B1

(12) United States Patent
Moor

(10) Patent No.: US 12,033,536 B1
(45) Date of Patent: Jul. 9, 2024

(54) TANGLE-FREE FLAG

(71) Applicant: Stephen Moor, Pt Pleasant, NJ (US)

(72) Inventor: Stephen Moor, Pt Pleasant, NJ (US)

(*) Notice: Subject to any disclaimer, the term of this patent is extended or adjusted under 35 U.S.C. 154(b) by 0 days.

(21) Appl. No.: 18/130,945

(22) Filed: Apr. 5, 2023

(51) Int. Cl.
*G09F 17/00* (2006.01)

(52) U.S. Cl.
CPC ...... *G09F 17/00* (2013.01); *G09F 2017/0008* (2013.01)

(58) Field of Classification Search
CPC ............ G09F 2017/0008
USPC ............ 116/174
See application file for complete search history.

(56) References Cited

U.S. PATENT DOCUMENTS 1,298,550 A * 3/1919 Newell ............ G09F 17/00 116/174
1,372,508 A * 3/1921 Herbener ............ G09F 17/00 116/173
5,319,967 A * 6/1994 Rickards, Jr. ............ G01P 13/045 73/861.74
D393,322 S * 4/1998 Suttles ............ D25/164
5,970,661 A * 10/1999 Bishop ............ E04H 15/006 52/63
2004/0031433 A1* 2/2004 Cardarelli ............ G09F 17/00 116/174
2017/0002487 A1* 1/2017 Ruzek ............ D04H 3/12
2019/0282037 A1* 9/2019 Johnson ............ A47K 3/38

FOREIGN PATENT DOCUMENTS

CN 102753740 A * 10/2012 ............ D01F 1/10
FR 2665491 A * 2/1992 ............ G09F 17/00
JP 2007-072113 A * 3/2007 ............ G09F 17/00

OTHER PUBLICATIONS

Contents of col. 5-6 and claim 1 of U.S. Pat. No. 4,659,144 dated Apr. 21, 1987.*
Faraz, M. et al., "Synthesis of Nanostructure Manganese Doped Zinc Oxide/Polystyrene Thin Films with Excellent Stability, Transparency, and Super-Hydrophobicity", Materials Chemistry and Physics, vol. 211, 2018, pp. 137-143.*

* cited by examiner

*Primary Examiner* — Daniel S Larkin
(74) *Attorney, Agent, or Firm* — DiMarino, Lehrer & Collazo, PC; Emmett S. Collazo; Anthony J. DiMarino

(57) ABSTRACT

A tangle free flag or banner that includes an anti-furling ballast system. The system is segmented and flexible, stitched into and sewn through the fly hem, featuring a compact design with ballast material packets of predetermined size and weight. Stitching and heat seals create a weighted-keel effect that balances expected flag-flying properties with anti-furling forces that prevent a flag from being tangled around a flagpole.

23 Claims, 8 Drawing Sheets

TANGLE-FREE FLAG

This is a continuation-in-part of co-pending application Ser. No. 17/032,987 filed on Sep. 25, 2020, a non-provisional utility patent application that claims the benefit of U.S. provisional patent application Ser. No. 62/905,903, filed Sep. 25, 2019.

BACKGROUND OF THE INVENTION

Field of the Invention

The present invention relates to flags and banners, and more particularly to prevent flags and banners from furling and tangling around the flagpole to which they have been attached.

Prior Art

Flag entanglement or furling occurs most frequently when a flagpole is fastened at a perpendicular angle relative to the ground. The angle of attachment to a structure commonly ranges from 90° degrees to any obtuse angle up to ±135°. In the case of flagpoles affixed to the ground, the angle would be ±180°.

Flags have a propensity to fall back on themselves in midair flight due their low mass. When a flag attains an orientation directly above the pole to which it has been attached, and the lift holding it up dissipates, the flag will fold back on to itself. As the amorphous flag plummets earthward, it will inextricably be pulled onto to the pole and furl. Once furled, there is no reliable mechanism in place for the next gust of wind to unfurl it.

The prior art includes various methods and means which attempt to accomplish this that have failed for multiple reasons and not gained commercial acceptance.

U.S. Pat. No. 2004/0031433A1 to Cardarelli; Flag Mounting Device seeks to solve the problem of flag rotation and furling by adding stiffeners and external appliances to the flagpole and to the flag itself.

U.S. Pat. No. 7,017,512 B2 to Laird; Flag Mounting Kit and Using The Same seeks to solve the problem of flag rotation and furling, much the same way as Cardarelli. Laird teaches the element of a halyard stiffener and a complex bearing assembly atop the flagpole to facilitate the flag in spinning around the flagpole.

U.S. Pat. No. 1,646,467 to Walton; Flag or Pennant Spreader seeks to solve the problem of flag rotation and furling by adding both internal and external stiffeners to the flag including a series of fasteners to an external swivel device attached to a flagpole.

U.S. Pat. No. 5,319,967 to Rickards; Wind Speed Indicator seeks to solve the problem of assessing wind speed and uses unfurling to indicate wind speed and direction. This prior art teaches that the flag may be hand-held during operation. Rickards teaches the use of three separate flags attached to a common point of attachment. Internal strings of beads sewn into the upper and lower field hems as well as the distal hem. Lights, reflectors, attachable indicia such as letters via Velcro® and various wind resistant cloth materials so that the three-flag compilation can alight in sequence. Weighting the three peripheral hems adding wind resistant cloth, and exterior indicia will not prevent a flag from furling.

U.S. Pat. No. 5,706,756 to Cunningham; Flag For Throwing seeks to solve the problem of flag throwing by enabling the flag to achieve trajectory when thrown. A handle is attached to the flag's field, an internal pocket would be constructed at that location, where a variety weighted materials could be inserted. Attaching a handle on an American flag and creating a weighted pocket so that the flag can be thrown with an intended trajectory is the complete antithesis for ornamental flags and banners.

U.S. Pat. No. 1,298,550 to Newell; Non-Entangling Device for Flags seeks to solve the problem of furling by constructing a pocket in the flag's distal hem that is filled with shot or ball bearings.

It is an object of the present invention to overcome the short comings, misconceptions, as well as the disadvantages in the prior art.

It is a further object of the present invention to provide a simple, less expensive and more practical means in which to manufacture a tangle-resistant flag that resists furling in every and all conditions for a flag flown outdoors.

It is yet a further object of the present invention to provide the most natural flying and draping flag that will not furl upon the horizontal flagpole from which it is being flown whereby its improvement is undetectable as possible and can self-right.

Flag design has yet to incorporate a built-in release mechanism for when they do furl on the pole, alleviating entanglement which may require manual intervention. This invention embodies both reducing the risk of tangling or furling, and self-righting after furling.

It is especially common for flags and banners to get wrapped around themselves or tangled when flown out of doors. This especially occurs when a flag or banner is hung, mounted or flown on a flagpole attached to a building, a structure or an immovable object such as a tree. Common mounting angles range from perpendicular or ±90° degrees and ±135° degrees. However, the flags being flown are not limited to just these two commonly used angles. They can be flown at any angle between ±90° and ±180°.

What commonly occurs is that a flag/banner tends to get caught up even in the gentlest gust of wind. Because of the flag being controlled by such a gust, the attendant lift created by the forces of the wind will routinely carry the flag over and above the horizontal flagpole to which it has been attached. This occurrence is quite common and is problematic. This situation creates the concomitant condition as to how flags furl around a horizontally erected flagpole.

Because the wind tends to blow in gusts, eventually the lift created by a gust of wind will drop out, creating a natural occurrence where the flag or banner will be prone to fall back onto itself. Upon careful observation, when this occurs, the flag is frequently being folded back onto itself whilst in midair. As the flag/banner begins its downward descent from its top-flight position above the flagpole, it has a natural propensity to land upon the flagpole due to the fact that the flag's halyard hem has been affixed to the horizontally orientated flagpole. The result is quite predictable, the flag lands upon the flagpole and the effects of the blowing winds will entangle it around the horizontally oriented pole. The result is that the flag drops onto the flagpole and will eventually get wrapped around the pole or it will get tangled in the flag's rigging in the case of a flagpole erected at ±180°.

The most popular solution to solving the problem of furling and flag entanglement is the addition of anti-tangling spinning collars which are mounted to horizontally attached flagpoles to which the flag is attached. This phenomenon of furling will occur whether anti-furling spinning collars are employed or not. Although this anti-furling hardware is designed to allow the flag to spin around the flagpole 360° degrees, to a large extent they still cannot eliminate a flag from furling. The problem of furling cannot be solved in this manner since the flag is too light and that its mass is distributed in an even fashion throughout the entire structure of the flag.

What actually occurs in the real world is as follows: A flag being flown on a side mounted or horizontally mounted flagpole that is affixed from ±90° degree angle through ±135° degree angle can frequently rise above the plane of the flagpole driven by a single gust of wind. As is often the case, the lift that has been keeping the flag aloft will drop out causing the flag to fall back on itself or fold back onto itself in topflight when the flag is above and perpendicular to the flagpole to which it has been mounted. Instead of the flag falling back to the original direction from which it originated, it has an inordinate propensity to fall directly onto the flagpole and get tangled. This phenomenon is referred to as furling and it routinely happens, because the wind primarily consists of gusts or bursts of energy. Quite commonly, after the gust subsides, the lift that has been holding the flag above the plane of the flagpole will die out. This presents a circumstance where the flag will immediately begin to lose its buoyancy and the process of falling back onto itself occurs. In so doing, the flag will frequently drop onto the flagpole and furl.

The premise of a lightweight flag rotating 360° degrees around a flagpole is flawed from the onset. Rarely, if ever, does a flag spin 360° around a horizontally mounted flagpole. That would be as rare as an individual being able to swing over the top bar of a swing set. At upper point in the swings arc, the force of gravity will become a much greater counterforce on the individual's weight than the momentum that was initially generated. Since a flag is both lightweight and supple, by the time the flag nears a topflight position in its flight relative to the pole, gravitational forces prevail on this weightless and supple cloth, and so it will fold back onto itself and land on the pole below.

BRIEF SUMMARY OF THE PRESENT INVENTION

The present invention comprises a Tangle Free Flag for symbolic or ornamental design that resists furling and will not tangle on a horizontally oriented flagpole in any weather condition.

A preferred embodiment is comprised of a ballast system that is made up of an array of packets that contains a fine grain quartz-based sand, where the system is fashioned into a belt-like configuration. A further embodiment is that this belt-like array containing packets of ballast, such as fine grain quartz-based sand, will be sewn into the unfinished fly hem of a flag or banner in such manner that it becomes an integral part of the flag's fly hem structure and one with the flag itself. The incorporation of any type of pocket or sleeve feature directly teaches away from the present invention.

Embodiments contemplate that these segmented packets are produced in a belt like configuration on a commercially available granular packaging machine that is designed to encapsulate loose fine grain quartz sand in a packet. The machine can produce a packet of a requisite dimension and weight that corresponds to the particular flag which is being ballasted. During the manufacturing process of the ballast belt, the packets are cojoined one to another by a heat-welded seam that separates each packet.

These heat-welded seams serve multiple purposes, including they separate the individual ballast loads from each other, while at the same time joining each packet one to another in a belt-like configuration. This allows packets to have free movement like a hinge, enabling greater flexibility, and more fluidity that a banner is preferred to have. In the case of the American flag, a ballast belt could contain, for example, 13 individual packets, which could correspond to one individual packet for each one of the 13 stripes, where the lateral edge of each stripe intersects with a corresponding pleat in the ballast belt configuration.

The packets would be produced in succession by the granular packaging machine, forming a belt like configuration that extends the entire length of the flag's fly hem. The ballast belts are to be custom tailored in accordance with the flag's specifications. Each flag and its specifications could be documented under the machine settings for each production run, and cataloged, like a pattern maker's archive.

Where the packets are manufactured using this technique, the ballast belts being produced would be particularly flexible at the heat-welded seam partitions, and not nearly as flexible at the packets themselves. However, since sand is a fluid material, the packet itself would not be stone-rigid, and would provide additional and requisite flexibility.

Furling occurs because flags/banners are constructed out of lightweight materials; comprising of a single sheet of cloth, or multiple sheets of nylon cloth sewn together as in the American flag. Flag fabric is not just limited to nylon, and there are various other material choices such as nylon polyester, cotton, polyester, cotton-polyester blends and other fabric combinations. The most durable flag material used for outdoor conditions is a nylon fabric with a specific gravity of approximately ±1.13 and a fabric weight of approximately ±100 GSM. An all-weather 3'×5' flag consisting of nylon fabric weighs approximately ±8.8 ounces. No one part of the flag is appreciably heavier than another; the weight is uniformly distributed throughout. For any particular part of the flag to affect its overall performance, it would have to be as far removed from the halyard as possible in order to have any affect.

It is especially common for flags and banners to get wrapped around themselves or tangled when flown out of doors. When a flag becomes rolled-up on itself or becomes twisted around the flagpole this event is referred to as furling. A flag can also get tangled in the halyard's rigging or the related mounting hardware that is used to secure the flag to the flagpole or mount.

A flag being flown on a horizontally mounted flagpole can frequently rise above the plane of the flagpole driven by a single gust of wind. As is often the case, the lift which has been keeping the flag aloft will drop out, causing the flag to fall back and fold onto itself. This occurs the while the flag is in topflight, above the perpendicular plane of the flagpole to which it has been connected. Instead of the flag falling back to the original direction from which it originated, it will inextricably fall upon the pole to which it has been connected and tangle. This phenomenon routinely happens because the wind consists primarily of gusts or bursts of energy. Quite commonly, after the gust subsides, the lift that has been holding the flag above the plane of the flagpole will die out, the flag loses its buoyancy, falls back onto itself as it folds, ending up as an amorphous pile of cloth thrown over a bar.

The most popular approach for solving flag furling is to incorporate the addition of plastic anti-tangling spinning collars which are mounted onto the flagpole to which the flag is directly connected. In theory, spinning collars are designed to allow the flag to spin 360° degrees around the pole, but due to its physical limitations, a flag is not capable of rotating 360° degrees around a horizontally mounted pole. Furling cannot be solved by this method, due to the flag's lightweight structure. The flag's lack of skeletal structure and low mass characteristics makes circumnavigating the pole problematic, tantamount to an individual swinging over the top bar of a swing set. At upper point of the swings arc, the force of gravity becomes a much greater counterforce on the individuals mass than the momentum initially generated. The chains supporting the swings seat, once taut at the height of the arc, now become limp as gravity pulls the seat along with its passenger earthward. Those forces which prevailed upon a weighted swing, will exponentially act upon a flag made of cloth due to its lack of skeletal structure, it light weight, and supple characteristics. As the flag nears a topflight position in its flight relative to the pole, the gravitational forces acting upon this amorphous piece of cloth, will cause it to fold back onto itself, pulling it earthward where it will inextricably lands on the pole.

An embodiment, which has not been realistically studied from a material science and engineering vantage point, is that flags have not been designed to take advantage of the available aeronautical and gravitational forces that could be utilized to keep them from falling back on to themselves and furling on a pole.

To date, flags have not been specifically weighted with the intention of favoring one part of the flag or banner over another part in order to fly in concert with the fickle nature of the wind and resist furling. Furthermore, their design has yet to incorporate a built-in release mechanism for when they do furl on the pole, alleviating entanglement which may require manual intervention. This invention embodies both options, which is an integral part of this flag's design, afforded by the non-obvious ballast system as taught.

As the prior art clearly teaches, there have been many attempts to solve the very real problem of flag furling and entanglement. These remedies have focused on using both internal and external stiffeners, pockets and sleeves, including various applied weighting systems applied to all areas of the flag. The other approach has been to incorporate various types of anti-tangle spinning fixtures to the poles upon which they fly. The prior art as recited, does not anticipate the novel embodiments which have been described in this invention's anti-furling ballasting system.

Initial Test Details and Location

The test came about because I was forever untangling my furled flag. The flag being flown was an Annin 3'×5' all-weather nylon flag. The flag was attached to a 5' wooden flagpole equipped with fully functioning plastic spinning anti-tangle devices. The angle of the side-mounted flagpole was customarily set at a 135° degree angle and the pole was inserted and locked down in the mounting bracket made of cast pot metal. This standard bracket offered 2 standard pole positions: 90° degrees and 135° degrees.

This setup was attached to a residential ranch style home and the home is exposed to the prevailing winds for this locale. The front of the home faces north and the home is sits in an east/west orientation. The home is located 1 mile from the Atlantic Ocean where the most common wind direction is easterly, split between winds emanating out of the northeast and southeast directions.

During storm conditions the prevailing winds generally emanate from the northeast direction. After these low-pressure systems pass off the Atlantic coast, the area routinely experiences heavy west winds that blow off the land toward the ocean. The flagpole, though unintentionally, was ideally setup to intercept these prevailing winds and was a perfect candidate for flying trials.

Test One

On Aug. 25, 2019 the test site was experiencing intermittent 20 knot northeasterly winds, perfect for observing if this early prototype would work. The flag undergoing the test was a well broken-in Annin 3'×5' nylon all-weather flag with brass grommets. It must be noted that this flag would constantly furl on this pole.

In order to create a repeatable performance baseline, the exact same flag, now modified with the ballasted fly hem was evaluated on this same flagpole.

The flag that underwent this test was the exact same flag, the Annin 3'×5' all-weather nylon flag. For this trial, the flag's fly hem was opened and a segmented sausage-like tube that contained 5.5 ounces of ballast was sewn into the hem. The segments of this tube were approximately 4" in length and this tube ran the entire length of the fly ends hem. The ballast was ordinary beach sand comprised primarily of very small grains of quartz. The sand was not so fine as to be powdery, as if it had been run through a ball mill.

It is important to note that this trial was intentionally being conducted without the advantage using any anti-tangle spinning collars. Both of the anti-tangle fixtures had been removed from the flagpole before the start of the trial.

This test was purposely conducted without the aid of any outside appliances or fixtures intended to aid the flag from tangling. The ballasted flag being tested had been directly attached to the flagpole employing only single loops for attachment through each grommet located in the halyard, using thin diameter nylon cordage. The top loop was pulled tightly and attached to the pole just beneath finial. The bottom loop was then pulled tightly around the pole and then tied off at the base of the flagpoles mount which was attached to the house.

The flag being evaluated was intentionally mounted so that it could not spin or twirl. Every effort was put forth for the flag to fall back on itself and tangle. As a matter of course, the most tangle prone flagpole arrangement and tangle prone means of attachment were specifically chosen to prove that the concept would work without the aid or assistance of any anti-furling spinning fixtures or rigging. This was intentionally done in order to determine whether further testing would be merited or whether the concept should be abandoned altogether.

During this test, the flagpole was intermittently set at both the 135° degree angle and at the 90° degree angle in order to observe both commonly flown angles. The flag during this trial never fell back on itself or furled. Based upon these results, it was decided to undergo a second test.

Test Two

In preparation for this test, an identical Annin 3'×5' all-weather nylon flag was purchased at Walmart. Just like the first test, the fly hem of this brand-new flag was opened up and the previously made ballast tube was inserted into the open hem, then the hem was stitched back in place.

This time, the improved tangle-free flag was tested on a modern 5' one-piece aluminum flagpole manufactured by Betsy Flags, also purchased at Walmart. The flagpole utilized, came equipped with a set of plastic anti-tangle spinning devices to which the flag was connected.

This flags performance was observed on Sep. 6, 2019 during the passing of Hurricane Dorian off the NJ coast. As previously stated, the test location was approximately 1 mile directly inland from the Atlantic Ocean. The event provided many hours of all types of winds and heavy gusts, many exceeding well over 20 knots. The winds were predominately out of the East Northeast and blew for many hours from that direction. After the low pressure had passed off shore, the winds came hard out of the West, which was normal.

The prototype during this significant blow performed flawlessly on a 5' foot aluminum flagpole equipped with plastic anti-tangle spinning collars.

This prototype continues to be under observation and is still exceeding all expectations. After 20 days of observation, this flag had not furled once, and this location consistently experiences variable and gusty wind conditions. Prior to the implementation of this test, this flag had furled multiple times per day.

Unlike the prior art, and the other commonly offered products that seem to have overpromised about their anti-tangling abilities, adequate prototype testing is essential when it comes to proof of concept, especially when it comes to improving upon an existing technology and developing a commercially viable product that is intended to outperform what is presently being consumed.

Observations

This improved tangle-free flag was designed to eliminate or significantly reduce the frequency of falling back on itself both with/and without the aid of tangle-free flagpole appliances. However, it has been observed to have superior performance when used in conjunction with these commonly available anti-tangle spinning appliances.

Thus far, the flying trials have shown that a weighted and segmented fly end hem alone, allows the flag to sail naturally as it normally would in the wind, yet resists falling back on itself. In the event that the improved tangle-free flag does flip over on itself, which thus far has not been observed, it would be far more able to right itself, because a weighted fly hem is similar in design to that of a weighted keel. This design was intended to take advantage of strategically placed ballast and gravitational forces that act upon that ballast. This ballasted material is intended to affect the flags performance; analogous to how the weighted keel of a sailboat allows the vessel to sail on turbulent seas in unruly winds. In prototype testing, the fly end's hem had a round weighted and segmented cloth tube sewed into the fold of the hem similar to that of FIG. 4. The ballast was comprised of ordinary sifted beach sand, and the weighted tube was divided into 4-inch segments with the total weight of the segmented tube being approximately ±5.5 ounces.

For those skilled in the art, it cannot be assumed that the number of tube segments, their lengths, weights or dimensions are intended to be limited as to the criteria shared regarding this prototype trial. It also must be stated that the more segments in the ballast tube the more flexible the ballast tube will be. It must be emphatically stated that the ballast tubes that may be employed are not limited as to their shapes, lengths, weights, sizes, number of segments, ballast material[s], and so forth. The finished ballast tube[s] can have an infinite number of combinations to deter the flag/banner from failing back onto itself.

In flying trials in heavy winds of 20 knots plus and in other high lift conditions, the prototype has been observed to fly considerably above the plain of the flagpole. This is the zone where it is most prevalent for a standard flag/banner to fall back on itself and furl. During these trials, it had been observed that when the prototype was in this zone and the corresponding lift dropped out, the flag would fold back just forward of the canton's hem and right itself. The proof of concept is that the flag was able to right itself and continue on flying regardless of whether the intermittent gales either added or decreased the lift. This can only be attributed to positive influence that the ballasted fly end hem has on the flag's ability to fly with complete freedom and not fall back on itself. Trials so far, have been limited to the fly end being ballasted. So far, these trials have demonstrated that this flag design can fly in variable wind conditions of 10 to 20 knots or above, for periods extending well over 24 hours in length without any tangling or furling. The phenomenon of the flag falling back, or the flag blowing back appears to have been overcome by adding a weighted/segmented cloth tube filled with ±5.5 ounces of sifted beach sand for ballast.

It has been observed that the optimum weight for the fly end alone could prove out to be somewhere in the 5-ounce range for a flag whose dimensions are 34.5 wide by 58 inches long, better known as a 3'×5' flag. The segment size was approximately 4 inches in length and the outside diameter of the tube was under $\frac{5}{16}^{ths}$ of an inch for the crudely made ballast tube. The tube diameter could be significantly reduced if it were professionally constructed, or if the screen size of the sand particles were reduced. The segmented tube that was sewn into the fly end hem of the flag ran the length of the hem, except that it was stepped back approximately ½" from the lighter two field hems.

For the purposes of illustrating for those skilled in the art, the final tube structure could resemble that of a string of very thin breakfast sausage links before being sewn into the fly end hem. Once the open hem was folded over and the segmented ballast was sewn in, the weighted hem was barely noticeable.

It has been observed that while at rest the flag will hang perfectly limp and exhibits a natural drape as if it had not been altered at all.

Under full sail in 20 knots of wind, the flag waves and snaps just like an unweighted flag, except it resists falling back on itself and tangling. It was anticipated that there could be some degree of furling during these conditions, since overcoming a flags propensity to fall back onto itself is quite difficult to achieve, but that scenario never occurred.

As observed thus far, +5.5 ounces of segmented sand filled tubing sewn into the hem of the fly end hem negates this from occurring. It is important to note at this time that ballast weight is either exactly where it needs to be, or it could possibly be reduced by an ounce or so. The criteria for making such a determination was based upon 2 separate trials where the improved tangle-free flag was subjected to wind speeds in excess of 20 knots of variable blowing gales, and observing the flag refusing to fall back onto itself after the lift would drop out from underneath it.

At this juncture no other weighted segmented tubing has been required to achieve the no foldback effect, but other variations are under consideration.

BRIEF DESCRIPTIONS OF THE DRAWINGS

The present invention will become more apparent when viewed with the following drawings, which detail the following elements:

DETAILED DESCRIPTION OF THE PREFERRED EMBODIMENTS

Figure 1:
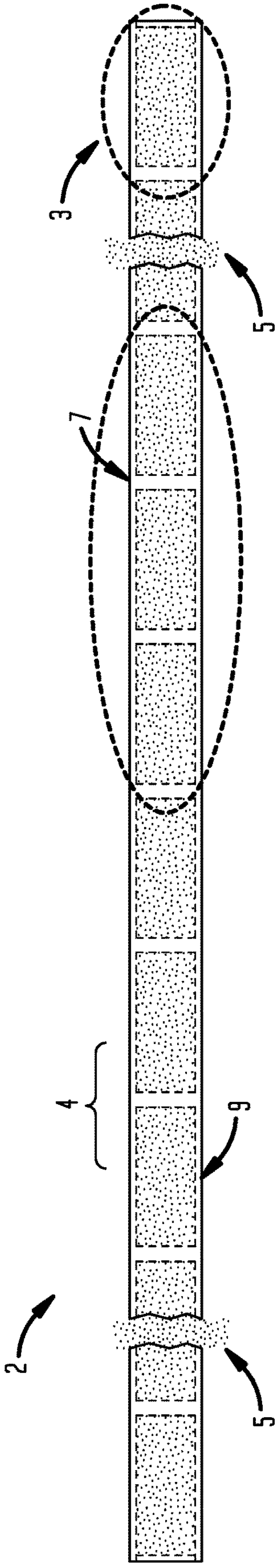
FIG. 1 is a top perspective of the anti-furling ballast system, a belt-like configuration of segmented and cojoined ballast packets shaped like raviolis filled with fine grain quartz sand.
Figure 2:
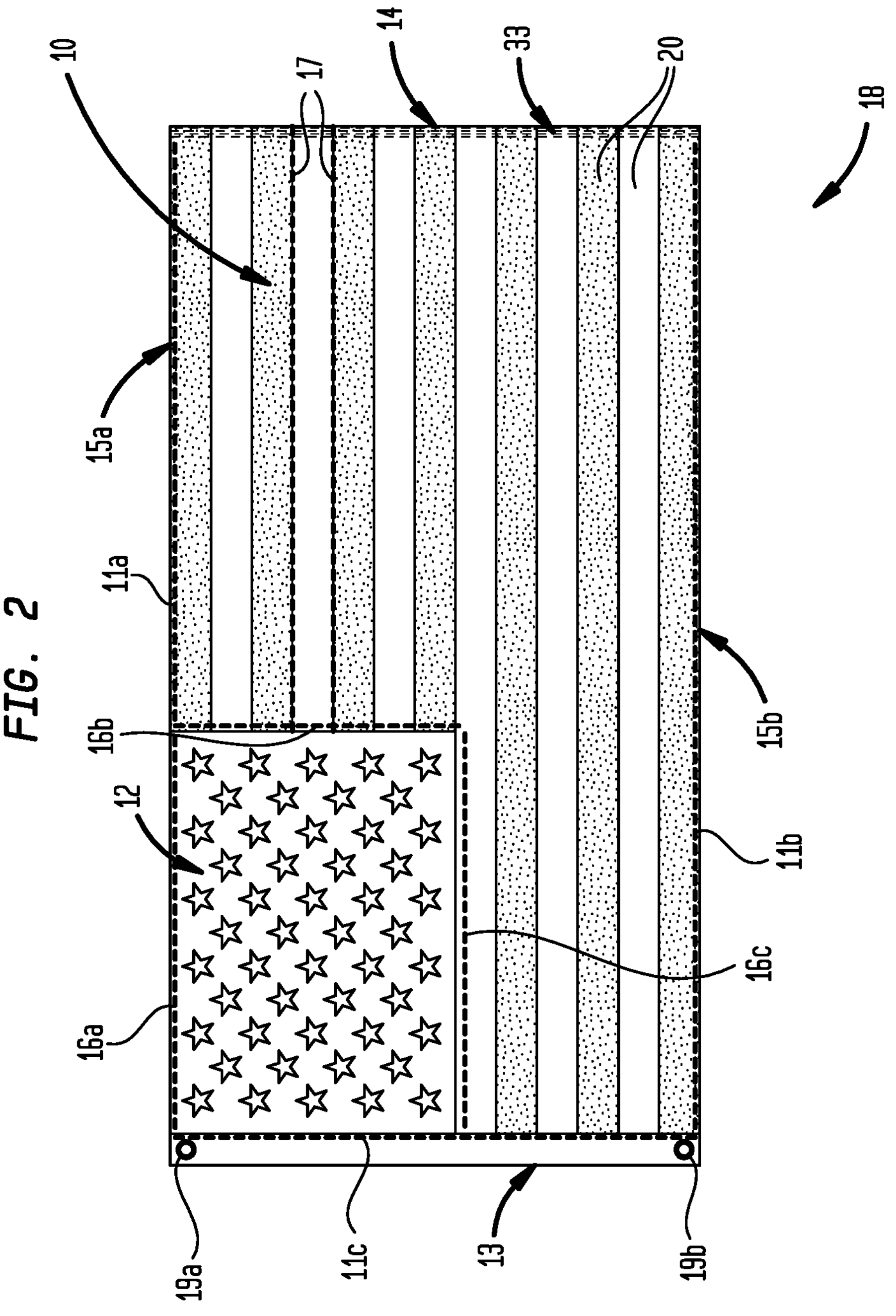
FIG. 2 is the frontal elevation of an American flag.
Figure 3:
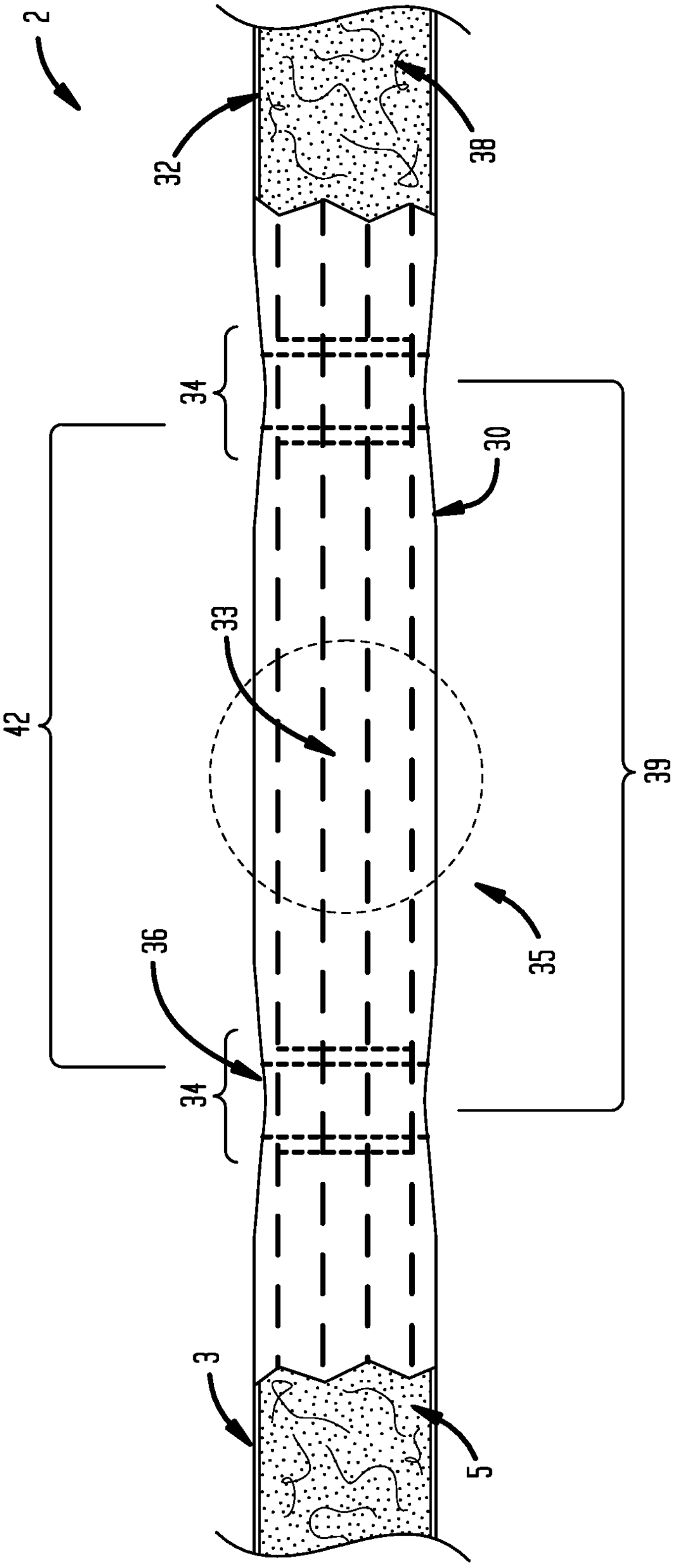
FIG. 3 is an exploded frontal cutaway view of three segmented and cojoined ballast packets, shaped like raviolis detailing as sewn into the finished fly hem, with stitching detail and ballast packet details made from the polypropylene spunbond nonwoven fabric material.

Referring now to the drawings in detail, and particularly to FIGS. 1-3, thereof, a new and improved anti-furling ballast system, embodying the principals and concepts of the present invention. Specifically, this invention comprises a self-contained, segmented and flexible ballast system FIG. 1 that is designed to be an integral part of any ordinary flag's/banner's fly hem 14 and will prevent it from furling or entanglement when flown on a horizontally mounted flagpole.

The combination of fine grain quartz sand encapsulated in a durable and flexible polypropylene spunbond nonwoven fabric material adds to the fluidity in the hem for this ballast system. Polypropylene, notably, will enable the ballast system to attain a high degree of fluidity. The definitions of fine, medium and coarse grade sand are known in the art and are as follows in this table:

| Technical data | |
|---|---|
| Grade of sand | Sieve size |
| Fine | 30-70 (.6-.2 mm) |
| Medium | 20-50 (.8-.3 mm) |
| Coarse | 12-30 (1.7-6 mm) |

The fine grain quartz sand will have particle or grain size as determined by what is known as a screen size or sieve size. In most embodiments, the grain size would be of a fine grade, which is 30-70 sieve/screen or (0.6-0.2 mm). Quartz based fine grain sand is commonly referred to as mason sand, which is readily available as a pre-washed and screened material with a particle size range in the 30-70 screen size which makes it a perfect candidate for the ballast material due to its small particle size, its purity and consistency. This material is plentiful and readily available in both bulk retail and wholesale, and currently available for under $30 dollars per ton in 2023. The advantage of having a small grain size results in less airspace between the grains, which affords better packing and ultimately a higher density ballast which equates to a reduced sized ballast packet. The smaller the packet size, the greater the mass, resulting in a less conspicuous ballast belt, which is the a major embodiment of this invention. Put another way, the sand must have particle size that allows it to be compactible to a requisite point, eliminating air spaces to a requisite point, and allows a designer to increase density of the packet and decrease the size of the packet.

This material is readily available and as ballast is as small and as undetectable as possible.

Further reduction in the sieve/screen size past that of mason fine grain quartz sand, would make the grain size too small, and impracticable for use in this invention. A reduction in grain size would result in utilizing a fabric with a much tighter, heavier, and less supple matrix, which would undermine the flexibility of the ballast belt design.

The fabric that will encapsulate the fine grain quartz sand is a nonwoven spunbond material comprised of polypropylene. The nonwoven spunbond material must be as lightweight and as flexible as possible. The intended purpose of this material is to encapsulate the fine grain quartz sand ballast, providing a durable, tear-resistant, light weight and hydrophobic outer skin. This feature enables the ballast packet to be formed into a belt so that it can easily be handled and then inserted into the fold of an unfinished fly hem before the final sewing operation takes place. Polypropylene benefits from superior abrasion resistance, ability to form heat created seams, and its natural ability to shed water, creating a superior material when compared to spunbonded polyester.

Embodiments using polypropylene, have superior abrasion resistance, its ability easily form welded seams and its natural ability to shed water. Polypropylene is an all-round superior material when compared to the other nonwoven spunbonded fabric options.

Embodiments with a spunbond fabric will benefit from nonwoven attributes over the much heavier woven rip-stop fabrics. Spunbond nonwoven fabrics can be found in grades where the material is very thin, flexible, supple, light in weight, and tear resistant due to its nonwoven matrix. Polypropylene spunbond has properties of a requisite melting point, tear resistance, and being sufficiently hydrophobic. As such, nonwoven spunbond polypropylene lends itself quite readily to be treated with many commercially available coatings which are performance specific and designed to achieve a desired result in a cost-effective manner. This material can be obtained with a hydrophobic coating, on the exterior side, which would make the exterior of the ballast packets water resistant. Manganese doped Zinc Oxide (Mn/ZnO) and polystyrene (PS) would provide a suitable film that resists water infiltration. This coating would deter water infiltration into the ballast packets, thus keeping the fine quartz sand dry, granular, free of clumping, and supple.

Another coating would be an anti-abrasion coating which would be applied to the interior facing surface of the nonwoven spunbond polypropylene material. This would be the side of the material which would form the interior of the packets. Tungsten Disulfide could be used as an anti-abrasive coating. By coating the interior side of the material with such a coating would ensure that the abrasive character of the fine quartz sand would be neutralized. Ensuring that the ballast belt packs will not degrade due to any internal forces of friction and ensuring that the ballast belt system would outlast the serviceable life of the flag itself.

A nonwoven material was specifically chosen over a woven type of fabric. Woven fabrics when cut are particularly problematic for this application. When cut, the selvage edge indicative of woven fabrics has a propensity to produce loose threads, and worse; the weave itself can start to loosen and begin to unravel. This shortcoming presents a situation where holes or voids would be created, causing the fine quartz sand to escape. Furthermore, a woven fabric would create an undue problem when it comes time to slit the ballast material to the specified dimension being sought. Using a woven fabric with a granular packaging machine in order to achieve these results would be problematic. Conversely, nonwoven spunbond polypropylene is not a weave at all. It is produced by being shot out of a dye, where the fibers are blown and matted together under heat and pressure. This process forms the material into one contiguous sheet of nonwoven mat, where each fiber has been bonded onto itself during its manufacture. Nonwoven spunbond is devoid of any woven matrix and will not create any loose threads or fibers when slit for production, since there is no weave that can unravel. Cutting or slitting nonwoven spunbond, is analogous to cutting a sheet of paper with a razor blade, creating sharp clean edges that can readily be folded one upon another and heat-melted resulting in crisp and sturdy heat welded seams.

This material yields itself to be easily formed into packages or packets without requiring any type of glue to seal the peripheral edges packages. The granular packaging machine applies heat that induces the fabric to melt, forming a seal. This eliminates unneeded materials from being added to the four edges surrounding the packets for formation. This application makes for strong welded seams during the packaging process eliminating glues and additional manufacturing operations, reducing time and associated costs.

This is accomplished by using a granular packaging machine, often referred to as a stick packing machine. This apparatus can employ a process of applying heat to the folded over material creating seams that are very strong, flat and compressed as a result of melting the spunbond polypropylene in order to form the seal. This spunbonded polypropylene has a relatively low melting point of ±170-190° degrees C. or ±338-374° degrees F. in order to create the seam.

A suitable weight for this polypropylene spunbond nonwoven fabric should exhibit a tight enough weave in order to retain the quartz sand of a sieve rating of 70 or finer, while still retaining the greatest suppleness and flexibility as possible. A preferable weight for this material could range anywhere from 30-50 GSM (grams per square meter).

The formation of packets may take the form of a flattened segmented design, akin to placing pillow-like square raviolis next to each other forming a chain. These raviolis constitute packets. The packets, like segmented pillows, should be comprised of the ballast matter being substantially compressed, compact, and not free flowing within the packet, or segmented section, to provide sufficient weight as the ballast must act like a keel, but also be flexible as previously noted to allow the flag to fly freely. Embodiments also include a round design like that of breakfast sausage links attached to one another, where the contents are comprised of the ballast matter being substantially compressed, compact, and not free flowing within the section.

Since the packets are manufactured using this technique, the ballast belts being produced would be particularly flexible at the heat-welded seam partitions, and not nearly as flexible for the packets themselves. However, since sand is a fluid material, the packet itself would not be rigid and would provide additional flexibility. In embodiments, the combination of fine grain quartz sand encapsulated in a durable and flexible nonwoven spunbonded polypropylene fabric will provide fluidity to this ballast system.

Another embodiment concerns the final product's overall appearance. It is well understood that altering the iconic appearance of chosen flags, for example the American flag, will result in commercial failure. Embodiments that employ a ballast that is as inconspicuous as possible are preferred. The flag's ability to fly while under sail in blustery conditions is often most important to flag and banner owners, and its characteristic drape in low level and no level wind conditions is of equal importance to these flag and banner owners.

In another embodiment, the ballast belt is designed to be so fashioned that it would be applicable in a commercial manufacturing environment. The packeted belt would be of a contiguous design to aid the seamster or seamstress as the ballast belt is placed inside the fold of the unfinished fly hem. As the rough-cut edge of the unfinished flag's field is folded over and tucked inside, the sewing of the fly hem can commence as if it wasn't there.

Regarding this procedure: a traditional technique of folding over of the rough-cut edge of the fly hem requires dexterity from the hands of a proficient seamster or seamstress. As contemplated, the placing of the ballast belt into the unfinished fly hem enables the individual to tuck that hard to manage rough edge up an under the ballast belt in one smooth a rolling motion. The rough edge can now be pinned under the fly hem by means of the ballast belt, thereby holding the edge down for a much faster and simpler sewing operation that the operator would normally encounter when applying the final stitching runs to an ordinary un-ballasted fly hem.

To complete the fly hem in some embodiments, four to five separate runs of stitching may be applied across the fly hem's entire length. With a singular belt configuration, consisting of one packet per stripe, the seamstress is able to apply the stitching as if the fly hem operation were devoid of the belt. Another embodiment of this invention makes the placement and the stitching in of the ballast belt as simplified as possible in order for a seamster or seamstress, or machine, to complete this operation. An abundance of consideration for the seamstress with regard to time and effort to complete this operation is of consideration since they might be compensated on a per piece basis.

The following has been witnessed and is yet a further embodiment of this invention. As the lift created by the wind that is supporting a flag which incorporates a ballasted fly hem suddenly drops out, the flag will brush against the horizontal flagpole that lies beneath it. In virtually every circumstance, the flag that incorporates a ballasted fly hem will be pulled back to earth and will land on the windward side of the pole, much like a pendulum that swings back to its point of origin. In a more extreme and rarified case, the flag might occasionally reach a flight orientation of nearly °180 degrees above the pole to which it has been connected. In that case when the supporting lift drops out, the flag will suddenly be pulled earthward exhibiting a strong propensity to fall upon the pole beneath. Should a ballasted flag fall upon the pole, two separate and beneficial elements are brought to bear on this situation. Firstly, the flag is immediately pulled free from the pole due to the forces of gravity acting upon the fly hem's concentrated mass pulling it earthward. This is so, because in the case of a 3'×5' all weather nylon flag, the fly hem has ±5.5 ounces of evenly dispersed mass along the extreme edge of the distal hem, whereby allowing gravity to act upon that particular part of the flags structure. Secondly, after landing on the pole, the aluminum poles low friction coefficient which is approximately ±μ 1.4 in conjunction with the low friction coefficient of the nylon fabric which is approximately ±μ 0.4 creates a concomitant condition where the nylon flag with a weighted fly hem will immediately slink off the horizontally mounted flagpole like a slithering snake slinking off a greased pole.

One embodiment of the invention has a belt-like ballast system as shown in the overhead elevation presented in FIG. 1. This ballast system is sewn into the flag's fly hem 14, and is designed to prevent any/all ordinary and unballasted flags FIG. 2 & FIG. 3, from furling 62 on a substantially horizontally attached flagpole 66 & 73.

The embodiment of this anti-furling ballast system FIG. 1, comprises a segmented belt-like configuration 2, comprising of a plurality of packets that resemble raviolis 6, that are filled with fine quartz sand ballast 5, where all four perimeters of the packet[s] 3, have been formed and heat-welded shut by an operation performed by a granular packaging machine. These packets comprising the packet belt are cojoined by a heat-welded seam[s] 7, that attaches one packet to another and gives the belt-like ballast system FIG. 1, its flexibility. The fine quartz sand ballast 5, contained within each individual packet is fairly compacted and does not lend itself to a high degree of flexibility. The flexibility of the system is intentionally and specifically derived from the cojoining heat-welded seams 7 that join the individual packets together created by the polypropylene spunbond nonwoven fabric material 51 & 56.

A point of hyperflexion may be created in the flag's fly hem where the double stitching on the medial and lateral sides of each stripe converges with the corresponding heat-welded seam formed by the adjacent cojoined ballast belt packets, creating a pleat with a swinging hinge effect, permitting each interior stripe two points of super flexation.

Figure 5:
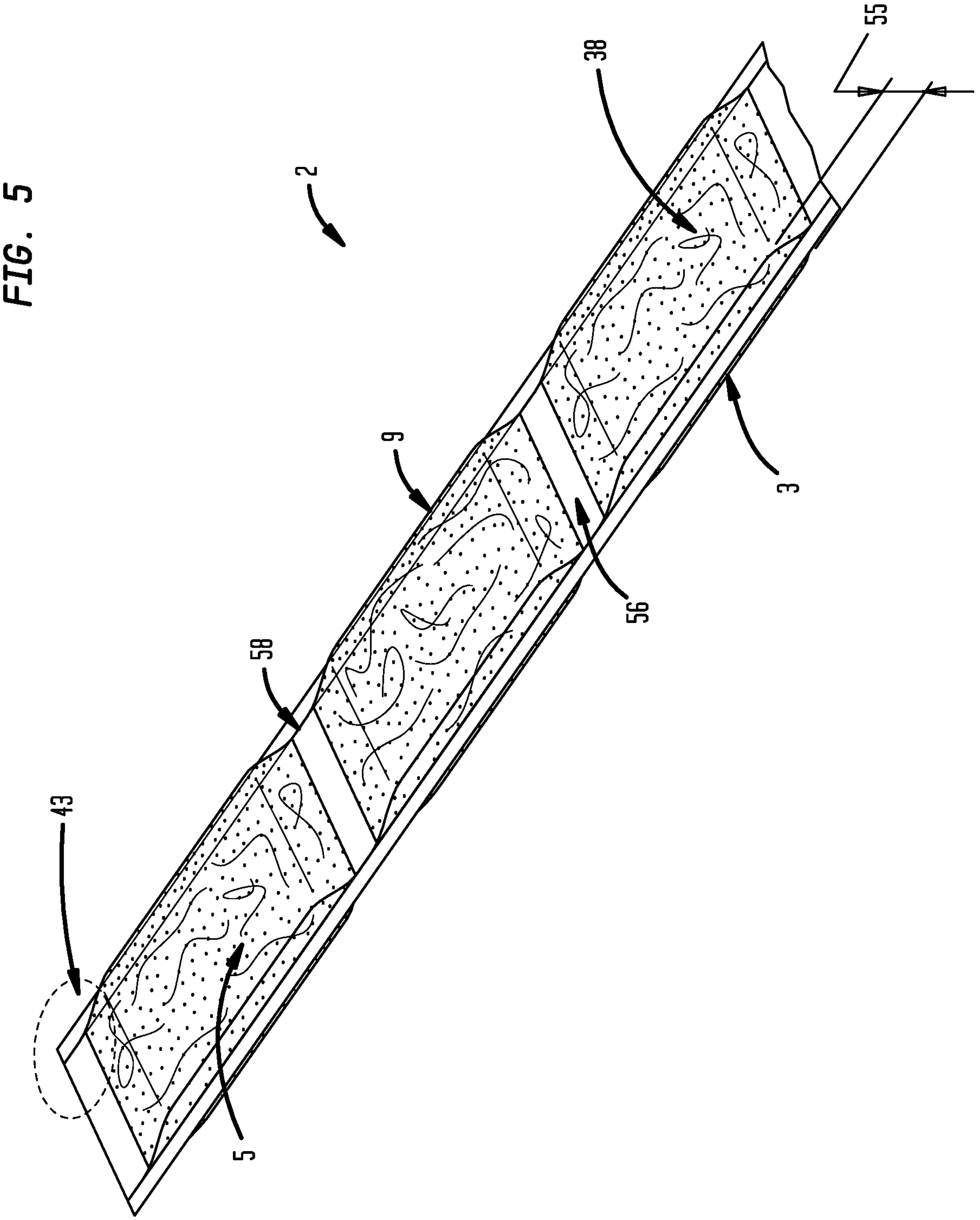
FIG. 5 is the exploded frontal perspective of two segmented and cojoined ballast packets shaped like raviolis detailing the polypropylene spunbond nonwoven fabric material, sand ballast contained within and the flexible heat-welded joints.

Another embodiment is based upon this ballast's design features, independent of the granular makeup of the quartz sand ballast 5 & 47, contained within the individual packet [s] FIGS. 3 & 5. This segmented belt-like ballast system FIG. 1 is filled with a fine grade, quartz sand 5, which is 30-70 sieve or (0.6-0.2 mm), having a specific gravity of ±2.66, whereas the flag's nylon fabric's specific gravity is ±1.13, resulting in a ballast to fabric ratio of greater than >2.4:1. The fabric to ballast ratio is a key contributing factor which enables this invention to accomplish its function as described.

The flexibility of the system is intentionally and specifically derived from the cojoining heat-welded seams 7 that join the individual packets together 51 & 56.

Another embodiment is based upon this ballast's design features, independent of the granular makeup of the fine quartz sand ballast 5 & 47, contained within the individual packet[s] FIGS. 3 & 5. This segmented belt-like ballast system FIG. 1 is filled with fine quartz sand 5, which has a specific gravity of ±2.66, whereas the flag's nylon fabric's specific gravity is ±1.13, resulting in a ballast to fabric ratio of greater than 2.4:1. The fabric to ballast ratio is a key contributing factor which enables this invention to accomplish its function as described. This range provide a balance to allow for a flag-waving effects but also allow for requisite self-righting properties. Flag composition and flag size will dictate the appropriate fabric to ballast ratio.

Yet, another embodiment of the segmented ballast belt FIG. 1 of the fly hem, is to lend flexibility to flag's fly hem 14 itself. The ballasted flag's fly hem FIG. 3 must allow the ballasted flag the freedom to dance upon the wind and exhibit a natural drape when hanging in no-wind or low-wind conditions. The amount of ballast applied should be as minimal as possible, so as not to draw attention to the improvement. When the various ballast material[s] were being evaluated, it was of paramount importance to identify a ballast component that exhibited the highest possible specific gravity and lowest associated material cost. Furthermore, safety, potential harm to people and to the environment were of major focus, notwithstanding, the chosen material had to be as inert and non-oxidative as possible in order to eliminate any possible staining of the flag itself, or the pavement below.

The final selection for the most suitable ballast material that met the overall requirements was a fine grade quartz sand of 30-70 sieve or (0.6-0.2 mm), having a specific gravity of ±2.66 5 & 47.

Figure 4:
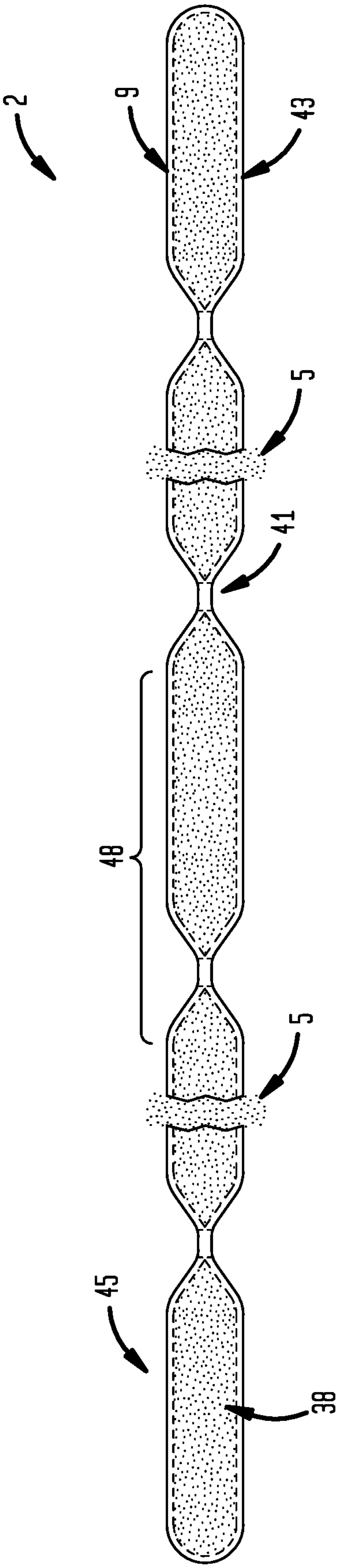
FIG. 4 is a top perspective of the anti-furling ballast system, a belt-like configuration of segmented and cojoined ballast packets shaped like sausage links filled with fine grain quartz sand.

FIG. 4, provides an overhead detail of, yet another embodiment of quartz sand filled 47, segmented packets resembling sausage links 48. These packets are co-joined by a heat-welded seam which the granular packaging machine is capable of forming a belt-like configuration of packets 41, together which features a very durable and water resistant heat-welded seam formed by melting the nonwoven spunbond material that circumnavigates each separate ballast packet 43, thereby making each packet 45, a self-containing ballast component.

The final selection for the most suitable ballast material that met the overall requirements was fine quartz sand 5 & 47.

FIG. 4, provides an overhead detail of, yet another embodiment of quartz sand filled 47, segmented packets resembling sausage links 48. These packets are co-joined by a heat-welded seam which forms a belt-like configuration of packets 41, together which features a very durable and water-resistant heat-welded seam that circumnavigates each separate ballast packet 43, thereby making each packet 45, a self-containing ballast component.

FIG. 5, provides an overhead detail of another embodiment of quartz-sand filled (or alternatively filled) packets 53 & 38. The ballast belt may be comprised of thirteen separate packets 53 & 38, for an example of the American flag one ballast packet per stripe 16. Each ballast packet's dimensions would correspond to the specific flag being ballasted and would be tailored accordingly. In the case of a 3"×5" all weather Nylon flag, the stipes measure approximately 2.5" inches wide and the fly hem on that particular flag would be approximately ±1" wide. It has already been determined that a flag with these specifications would require approximately ±5.5 ounces or ±246.68 grams of fine grade quartz sand in order to ballast a flag of this dimension and material composition. Each packet for an American flag of this particular specification would require each packet to contain approximately ±0.42 ounces or ±11.84 grams of fine grain quartz sand per packet 53. The dimensions of each packet would be approximately less than 0.75" wide by less than approximately 2.50" in length. In total there would be one contiguous belt which would consist of 13 packets with a nominal thickness of approximately less than ⅛" or less than 3.175 mm 55.

A further embodiment contemplates the manufacturing process of a ballasted flag with its finished fly hem as depicted in the exploded view of FIG. 3. As referenced, the prior art teaches away from a finished fly hem of the type that embodies the construction technique as comprised in 35. The finished fly hem incorporated in the American flag 14, consists of 4 to 5 rows of stitching 33, which run the entire length of the fly hem 14, in order to not only close the hem, but in order to finish this unique hem. Additionally, each one of the 13 stripes 16, that terminates in the finished fly hem 14, has two parallel rows of stitching that run down either side of each stripe 17 & 36. Each one of the individual stripes, is cojoined to each adjacent stripe with two parallel rows of stitching 17 & 36. The stitching pattern embodied in the fly hem 14 & 35 of the American flag precludes the formation of any pocket like structure, making it an impossibility to fabricate such a pocket. The prior art teaches that a pocket located in the distal hem of a flag must first be constructed in order to hold the various weighted materials placed therein. The formation and use of a pocket that contains the weight is an integral embodiment of the previous art as taught.

The sewing techniques employed in the construction of an American flag, most specifically the two parallel rows 17 & 36 and the 4 to 5 rows of stitching 33 that run parallel along the entire length of the fly hem 14 & 35, would preclude the formation of any pocket configuration in the fly hem FIG. 2-3. Therefore, it would not be feasible to either place or pump any of those referenced weighted materials as previously cited into a completed fly hem of an American flag FIG. 2-3, since its intricate cross stitching 33 & 36 would make the construction of a pocket impractical or unworkable.

Another key embodiment is that manufacturing process already in place, would remain virtually unchanged, eliminating any unnecessary new operations for the seamstress. The already long-established manufacturing process would also remain intact, since adding the pre-manufactured ballast belt system of FIG. 1 into the unfinished fly hem would not cause disruption, but conversely, aid in the final process of closing the fly hem shut. The already long-established manufacturing process would also remain intact, since adding the pre-manufactured ballast belt system of FIG. 1 into the unfinished fly hem would cause little disruption. By comparison, the addition of an artificial pocket as referred to in the prior art, would cause an inordinate problem since the intricate stitching pattern of FIG. 3 would have to be completely done away with.

This pre-made ballast system packet 31 & 38 would completely eliminate the mess and disorganization that loose sand, or any type of loose ballast would create in a manufacturing environment. Additionally, the time-tested stitching pattern 33 & 36 would not be altered in order to accommodate this improvement.

Another embodiment is to synergistically innovate within the framework of the long-established flag makers sewing techniques that are already in place, further ensuring that the ballast feature being added will become an integral part of the flag's finished fly hem. This system makes certain that both the flexibility of the finished flags fly hem 14 & FIG. 3 and that the individual ballast packets 31 & 38 will get locked into the fly hem 14 & 35.

Therefore, the embodiments of this ballast system will eliminate any possibility of the fine quartz sand ballast 37 leaking, shifting or gathering at either end of the fly hem, as would happen in an un-baffled open pocket design as the prior art teaches.

A further embodiment FIG. 5, as to the belt-like like ballast system of FIG. 1 & FIG. 4, the ballast material would be self-contained within individual packets 53, and the entire ballast system would be placed into the unfinished fly hem, folded over during the final stages of the manufacturing process and then sewn shut. As further contemplated, the belt-like ballast system of FIG. 1 & FIG. 4 would be of an acceptable size and would conform to the nominal dimensions of what would fit within the standard dimensions of the finished fly hem 14, of the flag being constructed FIG. 2. The seamstress operator would go about their final step in finishing the fly hem, with the ballast belt in place. Each ballast packet would have a maximum thickness of less than approximately ⅛" or less than 3.175 mm 55. The nonwoven spunbond polypropylene fabric material 38, envelope 32 & 57 that encases the quartz sand 5 & 47, would be constructed of a very thin-spun material as shown in 32 & 57, that would be easily pierced by the sewing machines needle, yet remain perfectly intact due to the materials high tear strength and the durable heat-welded seam 56 employed to seal the perimeter of the packets. The needle of the sewing machine would easily pass through each individual ballast packet 32, since the quartz sand material 37 contained within those packets are not so compressed as to inhibit the needle's performance during the closing of the fly hem.

Figure 6:
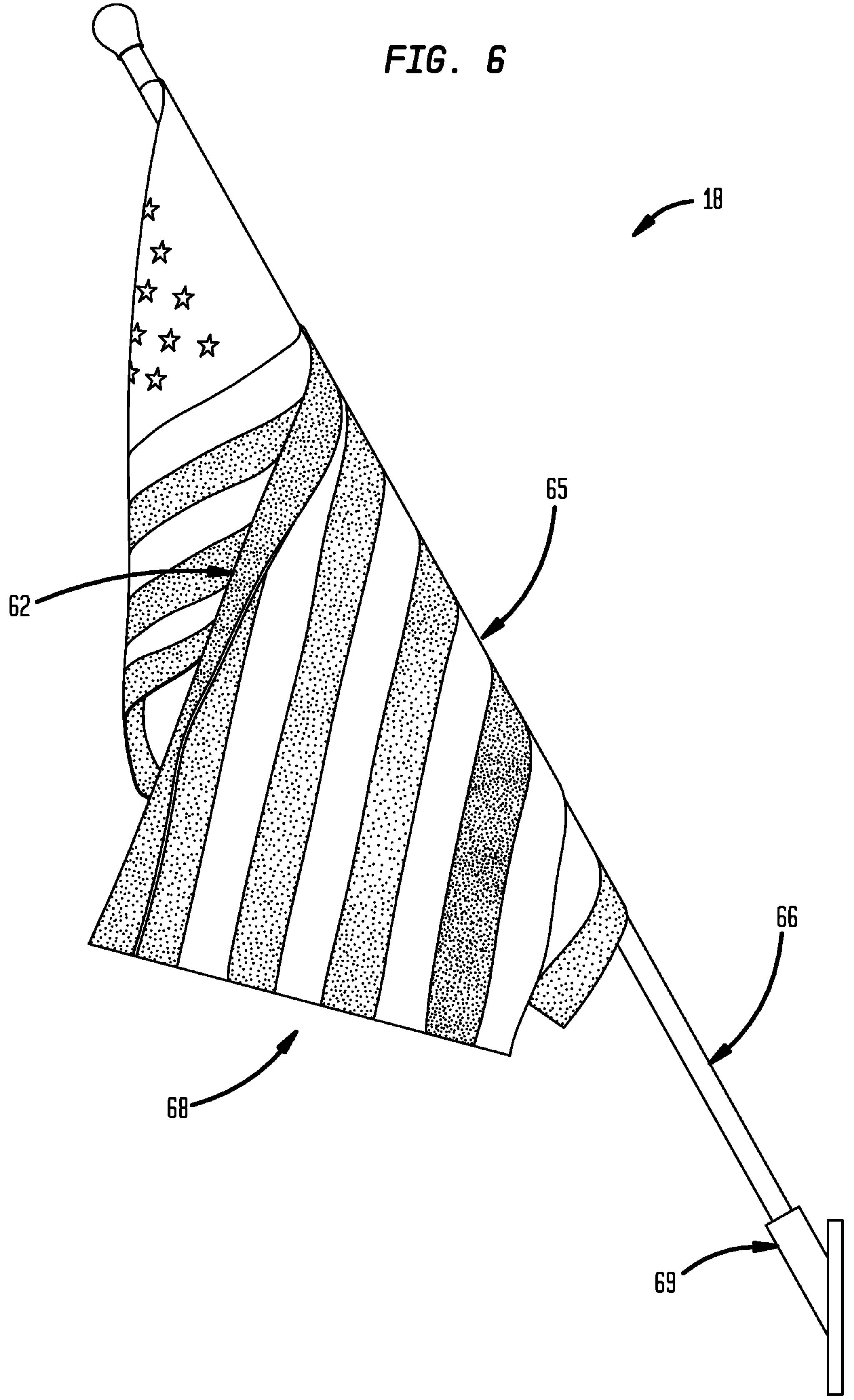
FIG. 6 is a side elevation of a furled flag, wrapped around a horizontally attached flagpole.

FIG. 6 All flag's, have a propensity to furl 62 attributed to their light weight and low mass that is equally distributed throughout its structure 18. Flag entanglement or wrapping itself around a flagpole 65 can be attributed to many factors. Most commonly, a sudden gust of wind can blow the flag onto its pole 66, or the flag's unballasted fly hem 68 when flying aloft can attain an attitude of approximately ±180° degrees 71, above a horizontally erected flagpole 73, where it will then fall earthward due to a lack of lift and will land upon the horizontal pole to which it has been attached.

Figure 7:
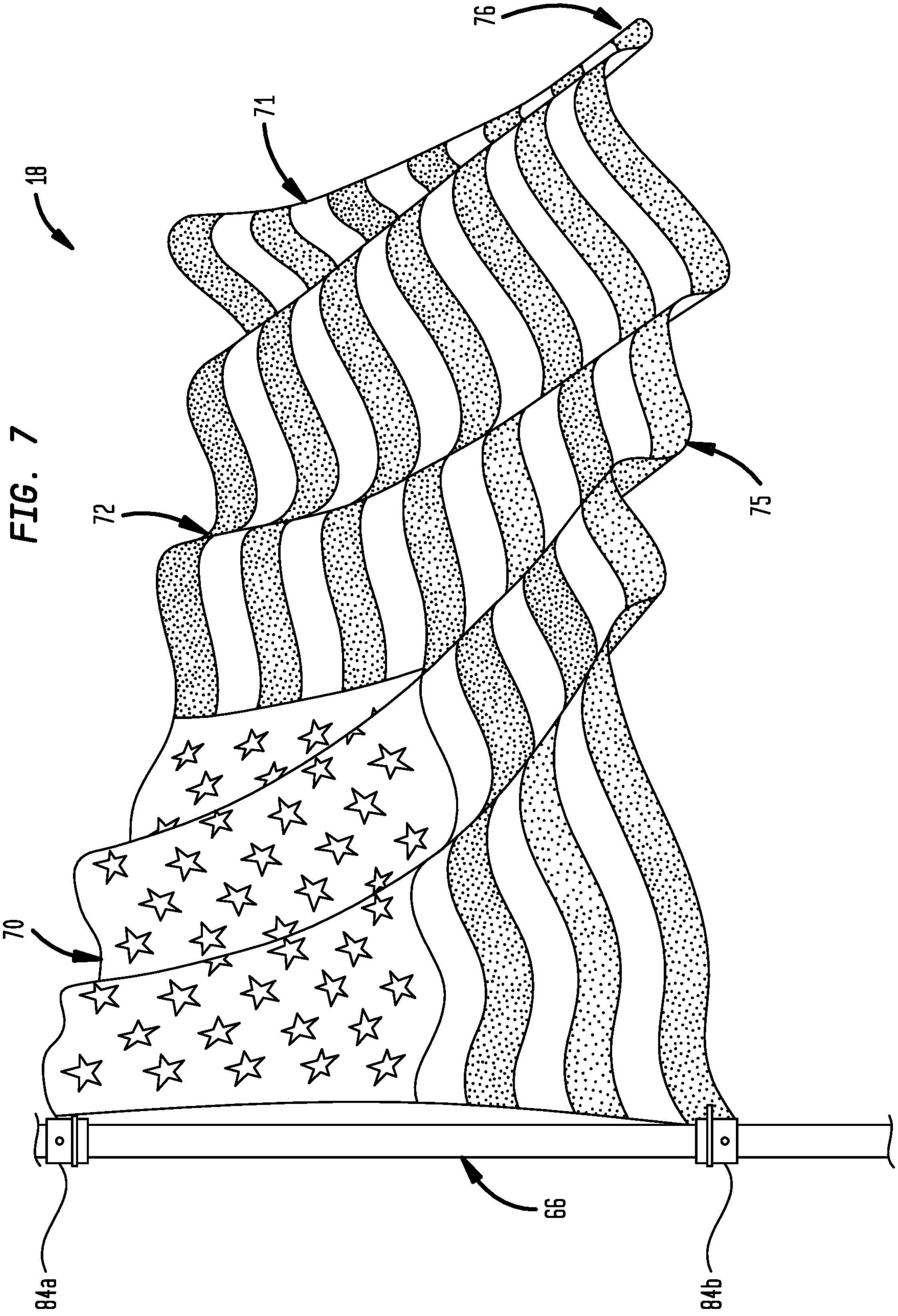
FIG. 7 is a frontal elevation of an American flag in the process of falling back or folding back on itself attached to a horizontal flagpole.

FIG. 7 is a frontal elevation of an American flag 75 & 18, and is an example of what flag looks like when a flag 75 has reached a top-flight orientation under full sail at ±180° degrees 71, above a horizontally erected flagpole 73. The flag is in the process of falling back 72, or folding back on itself 70, a causal effect of the lift dropping out. The flag is attached to the horizontally affixed flagpole 73, by the halyard 13 where the upper and lower grommets **19*a* & 19*b* are connected by a spring snap clip 81, which is then attached to an anti-tangle spinning collar 83 and locked onto the pole by a set screw 85**.

Figure 8:
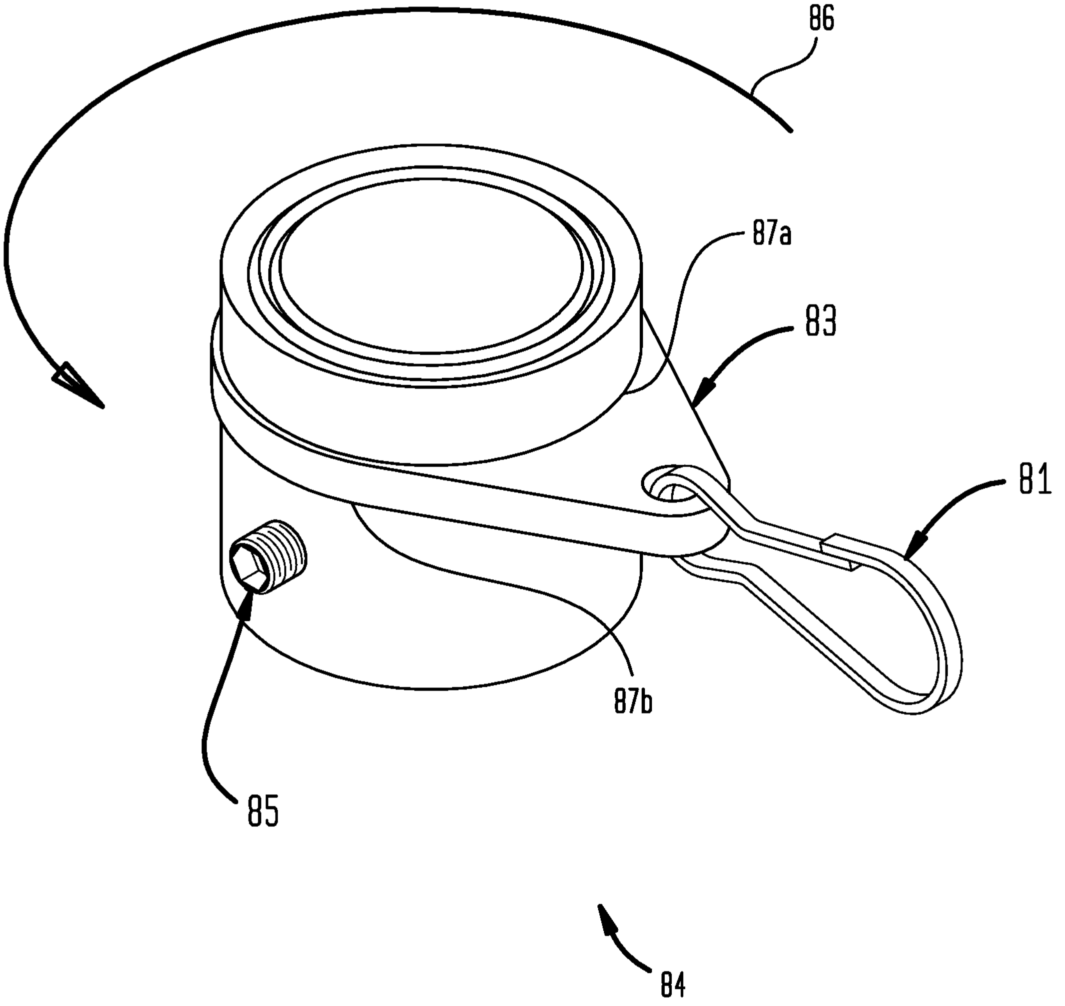
FIG. 8 is the frontal elevation of an anti-tangle spinning collar with the spring snap clip connector.

Once the lift created by the wind abates, the flag 75, begins its fall earthward. The flag is under the control of two separate forces; gravity and the mechanical connection FIG. 8, that is exerted upon flag connected to the pole 73 and is invariably pulled onto it and furl 62, and remain there due to its weightless nature. The weightless flag is controlled by the fickle nature of the wind. All of these factors acting in unison with the flag's attachment to the flagpole creates a predictable furling 62 outcome. This situation happens more times than not, when an unballasted fly hem 68, falls onto the flagpole or when an unballasted fly hem 76 under full sail reaches topflight of approximately ±180° degrees 71, above a horizontal flagpole 73, to which it has been attached.

Thus, there has been shown a unique Tangle Free Flag, which can easily and cost effectively be manufactured by utilizing readily available materials and machines without disrupting the commonly accepted manufacturing processes already in place within the flag making industry. Thus, there has been shown a unique Tangle Free Flag, which can easily and cost effectively be manufactured, because its construction conforms with commonly accepted manufacturing processes within the flag making industry. This tangle free flag can be flown on any and all existing flagpoles without any modification to either pole or flag. It can be flown with confidence in any and all-weather conditions, with or without the aid of any external anti-furling spinning collars and will not furl.

I claim:

1. A self-righting flag with an anti-furling ballast system, comprising:

a ballast belt, where the ballast belt is comprised of ballast packets, where the ballast packets are filled with fine quartz sand, where the sand is packed within each packet, the ballast packets forming a segmented configuration in the ballast belt, where the segmentation forms hinges at predetermined locations along a fly hem, where the ballast belt is disposed inside the fly hem of a flag's field fabric to create a segmented configuration in the fly hem, where the ballast packets are sewn to be securely disposed at predetermined locations within the fly hem, the flag further comprising an outer envelope that surrounds the ballast packets, where the outer envelope is comprised of a fusible non-woven spunbond fabric.

2. The flag of claim 1, where the fly hem is sewn with four rows of double needle lock stitching across the entire length of the fly hem, and where the stitching penetrates the ballast packets.

3. The flag of claim 2, where the four rows of double needle lock stitching further limit movement of the ballast packets within the fly hem and further preclude a pocket or a compartment of loose ballast material from forming within the fly hem.

4. The flag of claim 1, where granules of the quartz sand are of a fine sieve size, and where the outer envelope is further comprised of heat-fused seams at distal ends of the ballast packets.

5. The flag of claim 4, where a stitching is joined to the heat-fused seams at distal ends of the ballast packets to create at least one flexible pleat in the fly hem.

6. The flag of claim 1, wherein the sand is washed and screened and of a uniform particle size corresponding to between 30 and 70 sieve size.

7. The flag of claim 1, where ballast packets are joined to each other to form the belt that is disposed within the fly hem.

8. The flag of claim 1, where the ballast system forms a weighted keel for the flag.

9. The flag of claim 1, where the outer envelope is comprised of a tear-resistant non-woven fabric.

10. A self-righting flag, comprising:

a flexible ballast system in a fly hem, where the system includes ballast packets containing ballast material, where the ballast material is compressed into ballast packets and not loosely arranged in a pocket or compartment, and where the ballast packets are co-joined together in a belt-like configuration, an outer envelope surrounding the ballast packets, where the envelope is comprised of a fusible, non-woven spunbond fabric, where the outer envelope is further comprised of heat-fused seams aligned with opposing ends of the ballast packets.

11. The flag of claim 10, where the heat-fused seams surround the distal edges of the ballast packets.

12. The flag of claim 10, where the ballast packets are shaped like rectangular ravioli.

13. The flag of claim 10, wherein the flag manifests natural flying characteristics by responding to a range of wind forces by fluttering, waving, and ruffling.

14. The flag of claim 10, wherein the flag manifests an unaltered appearance compared to a conventional flag without a ballast belt.

15. A ballast system for a self-righting flag, comprising:

an arrangement of hinges disposed within a ballasted fly hem, the hinges comprised of cojoined distal ends of a series of ballast packets, the ballast packets and hinges forming a ballast belt that has been securely disposed within the ballasted fly hem through stitching, and the hinges being formed by a series of heat-created seams.

16. The ballast system of claim 15, where the flag is a United States flag, and the heat-created seams join the ballast packets to generate twelve hinges between the packets.

17. The ballast system of claim 15, where the flag is a United States flag, and where all ballast packets are disposed within the boundaries of horizontal stripes, and where heat-created pleats occur at the seams of the stripes.

18. The ballast system of claim 15, where the flag is a United States flag, and where the length of each ballast packet corresponds to the width of each stripe in the ballasted fly hem.

19. The ballast system of claim 15, where the flag is a United States flag, where a pleat is formed at the location where stitching joining the stripes overlays at least one heat-created seam in the ballast system, and where the stitching penetrates at least one ballast packet.

20. The ballast system of claim 15, where an outer envelope surrounds the ballast packets, the outer envelope being comprised of nonwoven spunbond fabric, where the fabric is selected from the group of a polyolefin resin and a polyolefin polymer, but not a combination of both, where the fabric's weight can range from 30 to 50 grams per square meter.

21. The ballast system of claim 20, where the weight of the fabric is dependent upon the dimensions of the fly hem being ballasted, and where the weight of the fabric will increase to lend additional strength to the fly hem as the size of the flag to be ballasted increases.

22. The ballast system of claim 15, where outer pleats are formed at the outer surface of the flag's fly hem, the outer pleats being disposed at the locations where heat seals are formed on the ballast belt.

23. A self-righting flag, comprising:

a fly hem, the fly hem further comprised of a ballast belt, the ballast belt further comprised of an outer envelope, where the outer envelope is comprised of upper and lower surfaces, where the upper and lower surfaces are comprised of a tear resistant, non-woven spunbond fabric, where four rows of double lock stitching secure the upper and lower surfaces of the outer envelope within the fly hem's field fabric.

* * * * *